US012645517B2

(12) United States Patent
Norton, Jr. et al.

(10) Patent No.: US 12,645,517 B2
(45) Date of Patent: Jun. 2, 2026

(54) DEVICE AND METHOD FOR DETERMINING THE STATUS OF A USED ELECTRONIC DEVICE

(71) Applicant: LENOVO (SINGAPORE) PTE. LTD., Singapore (SG)

(72) Inventors: Robert James Norton, Jr., Raleigh, NC (US); Justin Ringuette, Cary, NC (US); Sandy Collins, Durham, NC (US); Kevin W. Beck, Raleigh, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 119 days.

(21) Appl. No.: 18/350,181

(22) Filed: Jul. 11, 2023

(65) Prior Publication Data

US 2025/0021416 A1    Jan. 16, 2025

(51) Int. Cl.
*G06F 11/00*        (2006.01)
(52) U.S. Cl.
CPC .................................. *G06F 11/008* (2013.01)
(58) Field of Classification Search
None
See application file for complete search history.

(56) References Cited

U.S. PATENT DOCUMENTS

| | | | |
|---|---|---|---|
| 2015/0186233 A1* | 7/2015 | Young ................. | G06F 11/0709 714/38.14 |
| 2015/0261598 A1* | 9/2015 | Balasubramanian ........................ | G06F 11/0709 714/10 |
| 2019/0121647 A1* | 4/2019 | Por ....................... | G06F 9/4411 |
| 2021/0103680 A1* | 4/2021 | Lewis ................. | G06F 11/1417 |

OTHER PUBLICATIONS

Google Scholar/Patents search—text refined (Year: 2025).*
Google Scholar/Patents search—text refined (Year: 2026).*

* cited by examiner

*Primary Examiner* — Christopher S McCarthy
(74) *Attorney, Agent, or Firm* — Carroll, Hoette & Butscher, LLC; Josef L. Hoffmann

(57)        ABSTRACT
A system for determining the status of an electronic device is provided that can include a diagnostic device having a memory to store executable instructions and one or more processors. When implementing the executable instructions, the one or more processors are configured to, in response to coupling to an electronic device, communicate diagnostic code to the electronic device related to a boot sequence of the electronic device and configure the electronic device with the diagnostic code to dynamically adjust the boot sequence of the electronic device to provide a secure output mode. The one or more processors can be also configured to receive a diagnostic state of the electronic device while operating in the secure output mode and communicate the diagnostic state to a user.

20 Claims, 3 Drawing Sheets

300

306 — Wireless Transceivers

304 — Local Storage Medium

310 — Diagnostic Code

302 — Processor

308 — Output Devices

314 — Input Device

DEVICE AND METHOD FOR DETERMINING THE STATUS OF A USED ELECTRONIC DEVICE

BACKGROUND

Embodiments herein generally relate to a device, and methods utilized to determine the status of hardware and software of a used electronic device without accessing secure information on the electronic device.

Electronic devices, such as laptop computers, mobile phones, personal digital assistants (PDAs), iPads, other computing devices, etc. have become part of many individuals' everyday life. Such electronic devices continue to be improved to make the experience of users as enjoyable as possible.

There are numerous situations where a desire exists to reuse an electronic device. For example, schools often provide Ipads, laptop computers, etc. to their students to facilitate the learning process. Once a student graduates, leaves the school, stops attending school, etc., the school desires to provide the electronic device to a different student. Similarly, in a business environment, employees may be given their own laptop, smartphone or the like, where after the end of their employment, a desire exists to provide for another employee.

When businesses and schools have to process many electronic devices at a time for inventory or disposal purposes, it is very time consuming to open each device, power it, and boot into a diagnostic mode. This solution results in copious amounts of manual time and labor to separate the device, get power and charge to the device, boot into a diagnostic mode, and then run a time-consuming diagnostic. This procedure is a huge investment in time and the operator needs administration level credentials to even perform the operation. Another solution is to use of distributed asset management software that requires the device to be powered on and connected to that network.

Such solutions have numerous drawbacks. In addition to being time consuming, each method exposes personal data, work data, potentially confidential data, etc. to the person conducting the diagnostic, and potentially the network. With liabilities associated with handling of secure data, difficulties arise when such access is needed to provide the diagnostic. Thus, a need exists for improved control and security for determining the condition of a used electronic device.

SUMMARY

In accordance with embodiments herein, a system for determining the status of an electronic device is provided that can include a diagnostic device having a memory to store executable instructions and one or more processors. When implementing the executable instructions, the one or more processors are configured to, in response to coupling to an electronic device, communicate diagnostic code to the electronic device related to a boot sequence of the electronic device and configure the electronic device with the diagnostic code to dynamically adjust the boot sequence of the electronic device to provide a secure output mode. The one or more processors can be also configured to receive a diagnostic state of the electronic device while operating in the secure output mode and communicate the diagnostic state to a user.

Optionally, the diagnostic state of the electronic device can include a last known diagnostic state of software of the electronic device. In one aspect, the diagnostic state of the electronic device can include a last know diagnostic state of hardware of the electronic device. In another aspect, the boot sequence can be a basic input/output system boot sequence. In one example, to communicate the diagnostic state can include actuating an output device of the diagnostic device to provide an output. Optionally, the output device is at least one of a light source, light emitting diode, or a speaker. Alternatively, the output includes a series of sounds, or a light pattern. In another example, the diagnostic device can be portable and can have a body with a communication port extending therefrom. In yet another example, the communication port can be configured to couple to the electronic device.

In accordance with embodiments herein, a method is provided that may include, under control of one or more processors including program instructions to, in response to coupling to an electronic device, communicate, from a diagnostic device, diagnostic code to the electronic device related to a boot sequence of the electronic device. The method may also include to configure the electronic device with the diagnostic code to dynamically adjust the boot sequence of the electronic device to provide a secure output mode, receive a diagnostic state of the electronic device while operating in the secure output mode, and communicate the diagnostic state to a user.

Optionally, the diagnostic state of the electronic device can include a last known diagnostic state of software of the electronic device. In one aspect, the diagnostic state of the electronic device can include a last know diagnostic state of hardware of the electronic device. In another aspect, to communicate the diagnostic state includes actuating an output device of the diagnostic device to provide an output.

In accordance with embodiments herein, a system for determining the status of an electronic device is provided. The system can include a diagnostic device having a memory to store executable instructions and one or more processors. When implementing the executable instructions the one or more processors are configured to, in response to coupling to an electronic device, communicate diagnostic code to the electronic device related to a boot sequence of the electronic device. The one or more processors can also be configured to configure the electronic device with the diagnostic code to dynamically adjust the boot sequence of the electronic device to provide a secure output mode, receive a diagnostic state of the electronic device while operating in the secure output mode, the diagnostic state including at least a last known diagnostic state of software of the electronic device, last known diagnostic state of hardware of the electronic device, or a last known state of the electronic device that is recorded and updated upon a shutdown process, and communicate the diagnostic state to a user.

Optionally, the boot sequence can be a basic input/output system boot sequence. In one aspect, to communicate the diagnostic state can include actuating an output device of the diagnostic device to provide an output. In another aspect, the output device can be at least one of a light source, light emitting diode, or a speaker. In yet another aspect, the output can include a series of sounds, or a light pattern. In one example, the diagnostic device can be portable and has a body with a communication port extending therefrom. In yet another example, the communication port can be configured to couple to the electronic device.

DETAILED DESCRIPTION

Figure 1:
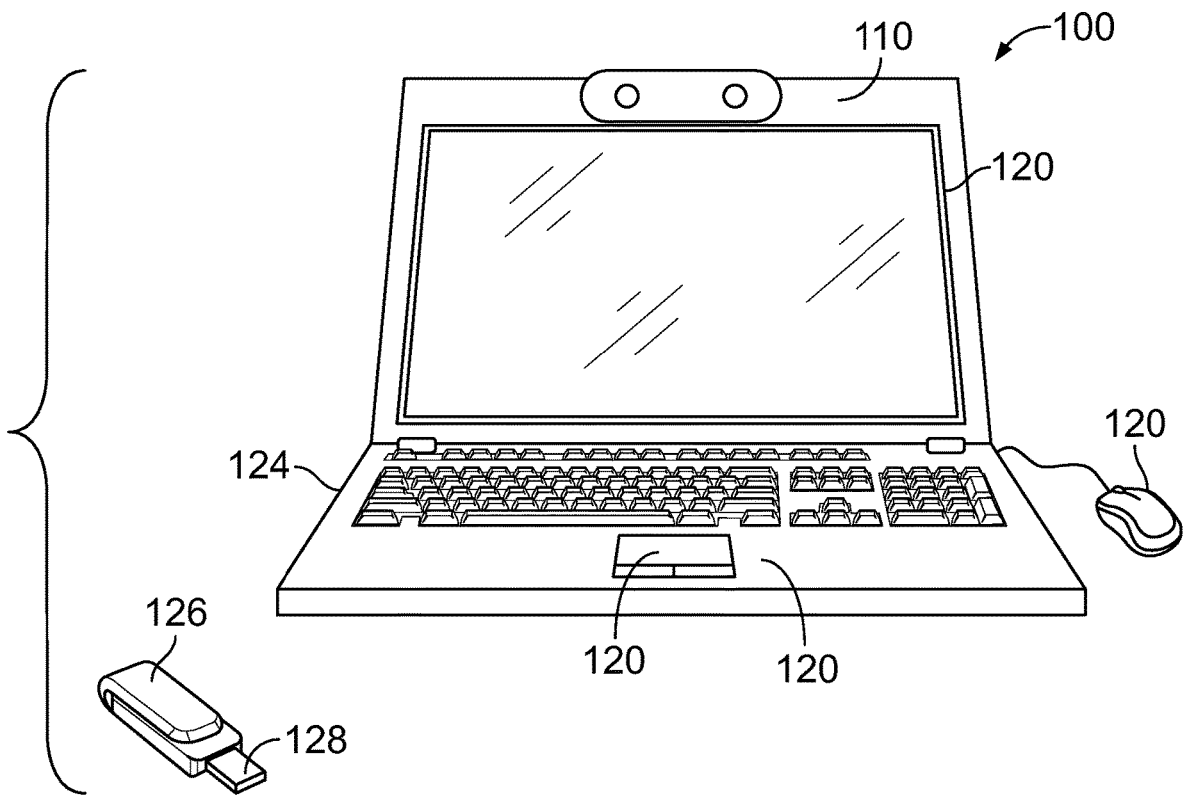
FIG. 1 illustrates a schematic block diagram of system for determining a status of an electronic device, in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "diagnostic communication" as used herein shall mean any and all communications that can be utilized to determine a diagnostic state of an electronic device. Diagnostic communication(s) can include outputs by an output device that can be decoded, deciphered, used to determine the diagnostic state. The diagnostic communications include sounds, including beeps, tones, a series of sounds, lights, colored lights, LED lights, etc., vibrations, haptic feed-back, non-auditory sound waves, light wavelengths in the visible spectrum, light wavelengths outside the visible spectrum, or the like. Diagnostic communication can also include words, texts, audible words, audible messages, etc.

The term "diagnostic state" as used herein shall mean the condition or status of electronic device testing performed on hardware or software of an electronic device at a given time. The test performed is testing to ensure that the hardware or software is working as it should be working. In one example, the diagnostic state of security software is that the last known software update occurred six months prior to a determination. Alternatively, in another example, the diagnostic state may be that three months ago, the microphone of an electronic device stopped working. To this end, the last known diagnostic state is a state that can be accessed by a diagnostic device.

The term "electronic device" as used herein shall mean any device, system, controller, etc. that may monitor and communicate data and information. Primary electronic devices can include smart phones, smart watches, smart remotes, smart clothes, vehicle controllers, etc. that can obtain context data. The electronic device is also configured to communicate with other electronic devices. The electronic device may communicate with one or more secondary electronic devices over a wire, through one or more wireless protocols including Bluetooth, GSM, infrared wireless LAN, HIPERLAN, 4G, 5G, satellite, or the like.

The term "last known" as used herein shall mean any state, diagnostic state, or the like that is the most recently recorded by an electronic device and can be accessed by a diagnostic device. Thus, if two diagnostic states are found, one occurring on January 1 of a year, and the other occurring on January 9 of the same year, the January 9 recording is the last known diagnostic state. To this end, if a recorded diagnostic state occurs on January 1, and a different diagnostic state is not recorded and cannot be accessed by a diagnostic device, the January 1 recording remains the last known diagnostic state.

The term "secure output mode" as used herein shall mean an operating mode of an electronic device wherein only a determined limited amount of data or information can be accessed by a diagnostic device. For example, in one embodiment, only the last known diagnostic state of hardware and software of the electronic device can be accessed and communicated. In another embodiment, the only information or data that can be accessed or communicated is the last know diagnostic state of hardware and software along with the last known state of the electronic device that is recorded and updated upon a normal shutdown process. The secure output mode is not a boot sequence and operates instead of a boot sequence. To this end, the amount of information that can be obtained from an electronic device in a secure output mode is less than the amount of information that can be obtained during a boot sequence.

The phrase "dynamically adjust" or "dynamically adjusting" or "dynamically adjusted" may be used interchangeably and when used herein refers to changing or varying in real time in response to a condition, or otherwise.

The phrase "real time" as used herein shall mean at the same time, or a time substantially contemporaneous, with an occurrence of another event or action. For the avoidance of doubt, as an example, a dynamically adjusted object or device is changed immediately, or within a second or two.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

A device and methods are provided for utilizing a diagnostic device that can plug into an electronic device such as a laptop computer, including through an USB-C coupling to determine the diagnostic status of the electronic device without going through a typical booting sequence. Instead, the diagnostic device prevents the normal booting sequence and forces the system into a secure output mode where the last known diagnostic state of both hardware and software can be communicated through an output device. The output device can be lights, LED lights, speakers, etc. that can blink, make noise, etc. that can be interpreted for analysis. In addition, the last known state of the electronic device that is recorded and updated upon the last shutdown process can also be communicated. As a result, a quick method is provided for determining the status of the electronic device without allowing a user to gain access to personal information of a user of the electronic device. Consequently, in situation where a device is being returned, sold, or the like and will not be utilized by a previous user again, and may be utilized by a new user, not previous user information is accessed by the individual performing the diagnostic status check.

FIG. 1 illustrates a system 100 that includes one or more electronic devices 110 that communicate with one another over a network 112. In example embodiments, the electronic devices 110 represent electronic devices that have been previously used are there is a current desire to repurpose the electronic device. Such situations can include where the electronic devices 110 were each utilized by students of a graduating class. Alternatively, the electronic devices can be work-based electronic devices provided to employees who have left a business. Optionally, the electronic devices 110 may communicate through a wholly or partially wired subsystem. The network 112 may represent the World Wide Web, a local area network, a wide area network (WAN) and the like. The electronic devices 110 may represent various types of electronic devices including, but not limited to, smart phones, desktop or laptop computers, tablet devices, smart TVs, fixed cameras, portable or handheld cameras, recording devices, digital personal assistant (DPA) devices and the like.

In one example, the electronic devices 110 may all be located within a similar environment. As an example, all of the electronic devices may be in an office building, school, shopping mall, store, coffee shop, home, apartment building, hotel, motel, stadium, event center, or the like. In each instance, the electronic devices 110 can have secure information related to a previous owner, confidential information of a company, or the like.

The electronic device 110 may include one or more processors, memory, a user interface 120, a network communications interface, and various other mechanical components, electrical circuits, hardware and software to support operation of the electronic device 110. It is recognized that not all electronic devices 110 include a display, user interface, and the like. For example, music playing device may only include a microphone and speaker without a display.

The memory can encompass one or more memory devices of any of a variety of forms (e.g., read only memory, random access memory, static random access memory, dynamic random access memory, etc.) and can be used by the processor to store and retrieve data. The data that is stored by the memory can include, but need not be limited to, operating systems, applications, user information, and other information. Each operating system includes executable code that can be stored in the memory that controls basic functions of the electronic device, such as interaction among the various components, communication with external devices via a wireless transceivers and/or component interface, and storage and retrieval of applications and data to and from the memory. Each application includes executable code that utilizes an operating system to provide more specific functionality for the electronic device.

The user interface 120 may include a variety of visual, audio, and/or mechanical devices. For example, the user interface 120 can include a visual input device such as an optical sensor or camera, and a mechanical input device such as a keyboard, keypad, selection hard and/or soft buttons, switch, touchpad, touch screen, icons on a touch screen, a touch sensitive areas on a touch sensitive screen and/or any combination thereof. As further examples, the user interface 120 may include a touch sensitive screen, a non-touch sensitive screen, a text-only display, a smart phone display, and/or any combination thereof. The user interface 120 permits the user to select one or more of a switch, button or icon in connection with various operations of the device 110. Similarly, the user interface 120 can include a visual output device such as a liquid crystal display screen, one or more light emitting diode indicators, or the like. The display may be touch sensitive to various types of touch and gestures.

The electronic device 110 can also include an electronic device communication port 124 configured to receive external devices that can provide functionality to the electronic device. For example, the electronic device communication port 124 can receive and couple to a dongle or universal serial bus (USB) drive, card, cord, cable, etc. through which data, information, etc. can be transferred and communicated. For example, the USB can include a memory such that information or data of the electronic device can be transferred to the USB when the USB is coupled to, or in communication with the electronic device 110, and then the USB can be removed and taken to a different electronic device and coupled in a similar manner so that the information or data can be communicated to the second electronic device.

The system 100 can also include a diagnostic device 126 that can also be coupled to the electronic device 110 including via the electronic device communication port 124. The diagnostic device 126 in one example is a USB that can communicate with the electronic device 110. To this end, the diagnostic device can include a diagnostic device communication port 128 that couples to the electronic device. In one example, the diagnostic device communication port 128 can be inserted into electronic device communication port 124 to provide a mechanical and electrical coupling. Alternatively, the diagnostic device 126 can wirelessly (e.g., without physical connection) communicate with the electronic device. In yet another example, the diagnostic device 126 is a USB-C where the "C" represents the type or shape of the communication port 128 utilized.

In one embodiment, the diagnostic device 126 is configured to access and output the last known diagnostic state of both the hardware and the software of the electronic device 110. In particular, the diagnostic device 126 includes diagnostic code that can be communicated to the one or more processors of the electronic device 110 to vary or modify a basic input/output system (BIOS) booting sequence. BIOS is firmware that can be utilized to provide runtime services for operating system hardware of an electronic device 110. The BIOS provides the sequence and operations of the electronic device 110 upon start up, including initialization and testing of the hardware. However, when the diagnostic device is in communication with the electronic device, the diagnostic code alters the BIOS such that the testing and initialization does not occur. As a result, access to hardware such as memory that can contain secure or confidential information of a previous user, company, etc. is not accessed. Instead, in response to the detection of the diagnostic device 126 and the diagnostic code, the electronic device 110 enters into a secure output mode that only communicates the last known diagnostic state of hardware and software of the electronic device 110. To communicate the last known diagnostic state, the diagnostic device provides a diagnostic communication. The diagnostic communication can include a series of audible beeps, a series of flashing lights, a sequence of color-based lights including light emitting diodes (LEDs), or the like. To this end, in example embodiments, the diagnostic device, or a remote device in the area utilized within the system 100 can include one or more sensors such as cameras, microphones, or the like utilized to capture the flashed, sounds, beeps, etc. to determine the status of the electronic device 100. As a result, the diagnostic communication can then be decoded or utilized for determining the last known diagnostic state of the hardware and software of the electronic device.

In addition, in one example, within the diagnostic code can be code that communicates with the BIOS to determine the last known state of the electronic device 110 that is recorded and updated upon a normal shutdown process. By having the last known state of the electronic device, along with the last know diagnostic state of the hardware and software, a user is able to ascertain the status of the electronic device 110 without having to fully boot the electronic device 110. As a result, no access to secure or confidential information is provided and time is saved.

Figure 2:
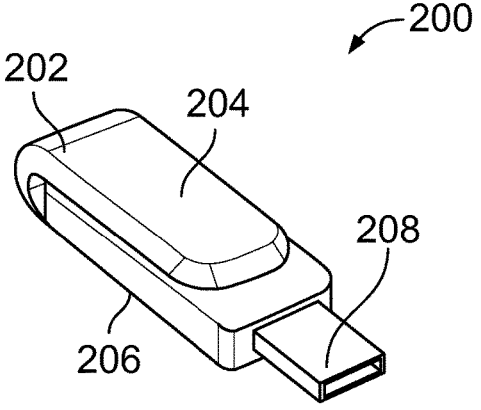
FIG. 2 illustrates a plan side view of a diagnostic device, in accordance with embodiments herein.

FIG. 2 illustrates one embodiment of a diagnostic device 200. In one example, the diagnostic device 200 can be the diagnostic device illustrated in FIG. 1. The diagnostic device 200 includes a body 202 that can be a hard shell to protect the contents within the body 202. The body 202 can be of size and shape to be placed in a pocket. To this end, the body 202, and consequently the diagnostic device can be portable. In one embodiment, the body may include an attachment mechanism such as an opening for coupling to a key ring. In one example the body can be made of plastic. Within the body can be a printed circuit board, card, or the like (See FIG. 3) that includes electronic components that need to be protected from the environment, including from dust, debris, physical contact, dropping of the diagnostic device, etc. In one embodiment, the body 202 can include a first body portion 204 and a second body portion 206 that are coupled together. In this manner, the first body portion 204 and second body portion 206 can be pulled apart to access the interior of the body 202 in case repair, replacement, or the like is required for the electronic components within the body 202.

Extending from the body 202 and coupled within the body 202 is a communication port 208. In one example, the communication port can be a USB-C commination port, though in other embodiments the communication port 208 can be other shapes and sizes to couple to various electronic devices. The communication port 208 functions to mechanically and electrically couple the diagnostic device to an electronic device. In one embodiment the communication port snuggly fits or is snuggly coupled within a corresponding communication port of an electronic device. In this manner data and information can be passed from the diagnostic device 200 to an electronic device, and from the electronic device to the diagnostic device 200.

Figure 3:
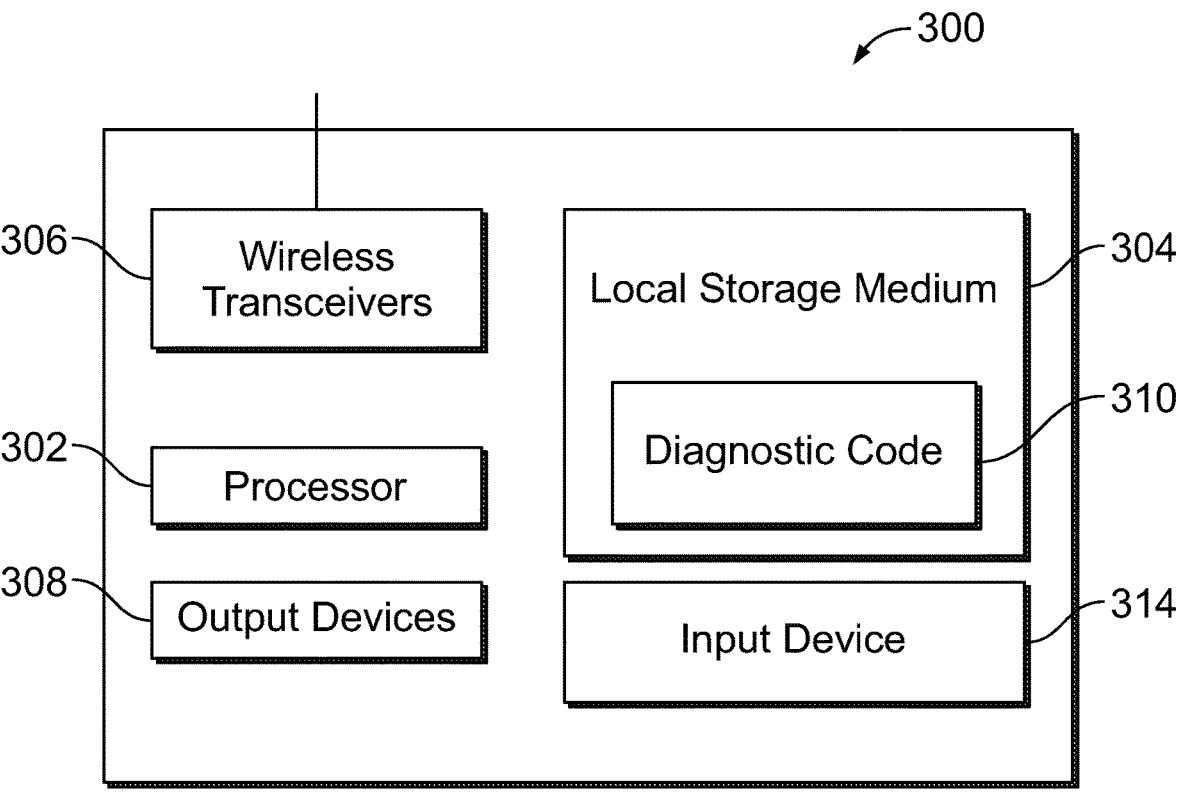
FIG. 3 illustrates a schematic block diagram of a diagnostic device, in accordance with embodiments herein.

FIG. 3 illustrates a schematic diagram of a diagnostic device 300. In one example the diagnostic device 300 is the diagnostic device of either of FIGS. 1 and 2. The diagnostic device can have an outer body (see FIG. 2) that houses one or more processors 302 (e.g., a microprocessor, microcomputer, application-specific integrated circuit, etc.), a local storage medium 304 (e.g., memory), a transceiver 306, and output devices 308.

The local storage medium 304 can encompass one or more memory devices of any of a variety of forms (e.g., read only memory, random access memory, static random access memory, dynamic random access memory, etc.) and can be used by the one or more processors 302 to store and retrieve data. The data that is stored by the local storage medium 304 can include, but need not be limited to, user input information, diagnostic application information, operating system information, obtained data, informational data, etc. As used herein data and information can be utilized interchangeably. Each application includes executable code that can controls basic functions of an electronic device to which the diagnostic device 300 is electrically coupled, such as interaction among the various components, storage and retrieval of applications, etc.

The local storage medium can include a diagnostic application 308 stored therein that includes executable diagnostic code 310 that can be communicated from the diagnostic device 300 to an electronic device that is in communication with the diagnostic device 300. The diagnostic code 310 in real time can dynamically adjust the (BIOS) booting sequence of the electronic device. The diagnostic code configures the electronic device to enter a secure output mode. In the secure output mode the diagnostic device does not have access to any personal information related to a user or former user of the electronic device. Instead, the one or more processors of the electronic device communicate the last known diagnostic state of hardware and software of the electronic device.

The diagnostic application 308 additionally includes diagnostic code to communicate this diagnostic information (e.g., last known diagnostic state of the hardware and software of the electronic device) to a user. In one example, the diagnostic code communicates with the electronic device so that an output device 308 of the electronic device provides the diagnostic communication. The diagnostic communication can be a sound, sounds, a series of audible beeps, a series of flashing lights, a sequence of color-based lights including light emitting diodes (LEDs), or the like. Alternatively, the diagnostic device 300 includes output device(s) that provide diagnostic communications including a sound, sounds, a series of audible beeps, a series of flashing lights, a sequence of color-based lights including light emitting diodes (LEDs), or the like. Thus, the output devices can include speakers, lights, LEDs, haptic devices, or the like that can be utilized to provide the diagnostic communication to the user.

In example embodiments, the diagnostic device 300, or a remote device in the area, can also include input devices 314 such as one or more sensors such as cameras, microphones, or the like utilized to capture the flashed, sounds, beeps, etc. to determine the status of the electronic device. As a result, the diagnostic communication can then be decoded or utilized for determining the last known diagnostic state of the hardware and software of the electronic device.

In addition, in one example, within the diagnostic code 310 can communicate with the BIOS to determine the last known state of the electronic device that is recorded and updated upon a normal shutdown process. By having the last known state of the electronic device, along with the last known diagnostic state of the hardware and software, a user is able to ascertain the status of the electronic device without having to fully boot the electronic device. As a result, no access to secure or confidential information is provided and time is saved.

Figure 4:
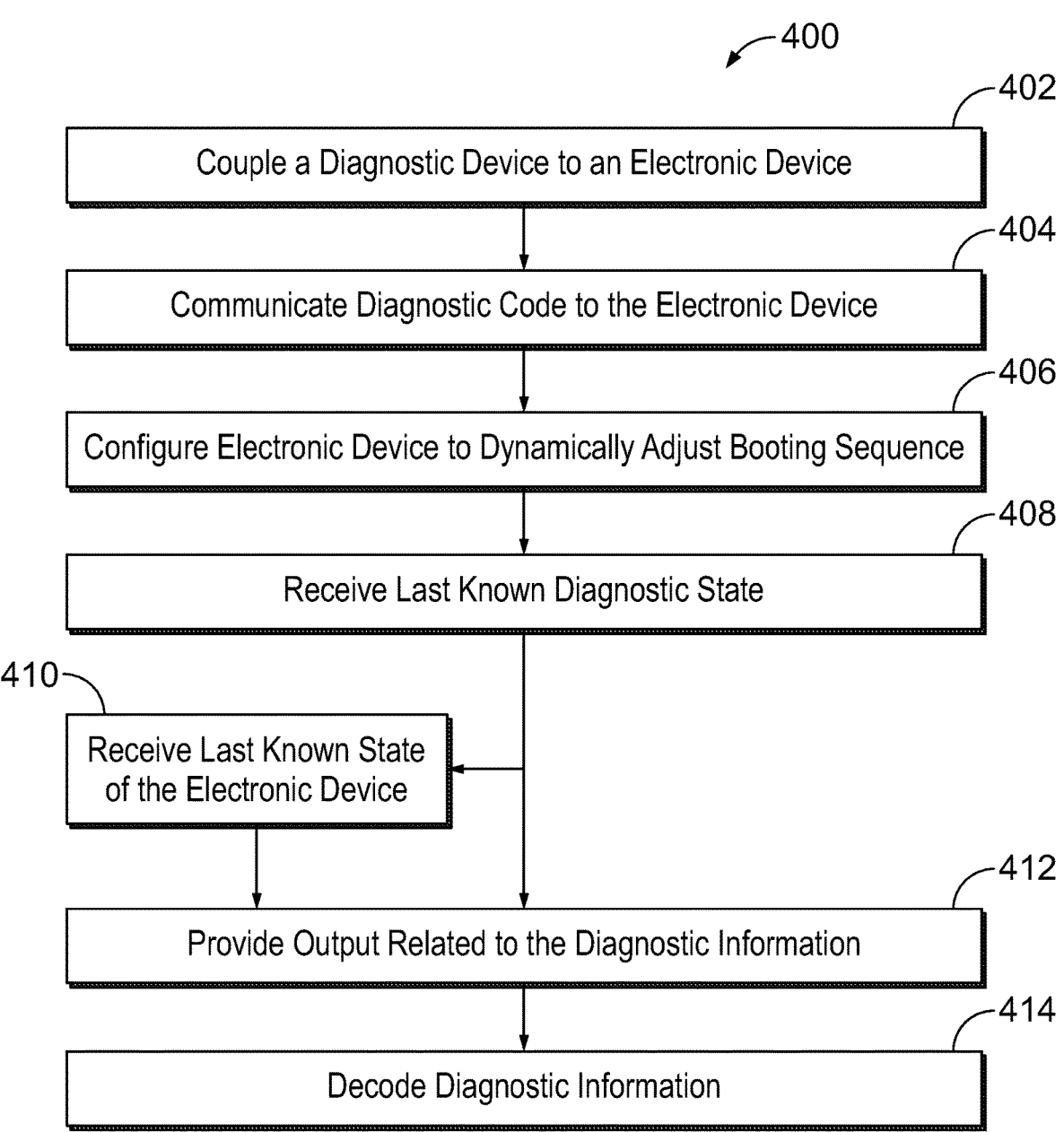
FIG. 4 illustrates a block diagram of a process for determining the status of an electronic device, in accordance with embodiments herein.

FIG. 4 illustrates a block diagram of a method 400 of determining the status of an electronic device. The method 400 may be implemented utilizing any system, electronic device, diagnostic device, etc. of FIGS. 1-3.

At 402, a diagnostic device couples to an electronic device. In one example, the diagnostic device includes a communication port that is mechanically and electrically coupled to the electronic device. To this end, the diagnostic device can be a USB-C type device that attaches to an electronic device. In other applications, the diagnostic device may initiate communications with the electronic device via wireless communication, including wireless communication protocols.

At 404, in response to initiating a communication between the electronic device and the diagnostic device, the one or more processors of the diagnostic device communicate diagnostic code to the electronic device. The electronic code can be an any coding language that can be executed by the one or more processors of the electronic device.

At 406, via the diagnostic code, the one or more processors of the diagnostic device configure the electronic device to dynamically adjust the booting sequence of the electronic device. In one example the booting sequence is a BIOs booting sequence. By dynamically adjusting the booting sequence, instead of running diagnostic checks on the hardware and the software of the electronic device that may expose the person using the diagnostic device to personal or confidential information on the electronic device, only diagnostic states of hardware and software is communicated.

At 408, the one or more processors of the diagnostic device receive the last known diagnostic state of at least one of software or hardware of the electronic device. In one example, the last known diagnostic state of each piece of software and each piece of hardware of the electronic device is communicated. Alternatively, only some of the last known states of the hardware and/or software are communicated.

At 410, optionally, the one or more processors of the diagnostic device receives the last known state of the electronic device that is recorded and updated upon the shutdown process. This information provides additional diagnostic information for determining the status of the electronic device.

At 412, the one or more processors of the diagnostic device causes outputs related to the diagnostic information obtained from the electronic device. The diagnostic device itself can provide the outputs on output devices such as lights, LEDs, speakers, etc. Alternatively, the output can be provided by the electronic device, or even a remote electronic device in communication with the diagnostic device.

At 414, the output(s) related to the diagnostic information can be decoded or reviewed so that users can determine the status of the electronic device. By having the diagnostic device, a user can quickly determine the diagnostic status of numerous electronic devices. As an example, whereas it could take days for several users to boot up and make determinations regarding the diagnostic status of one hundred electronic devices that are laptop computers of graduating seniors, by using the diagnostic device, the same one hundred electronic device could be reviewed in less than a day by a single user of the diagnostic device. Thus, the diagnostic device not only improves security for the electronic devices, but it also increases the speed at which used electronic devices can be reviewed for repurposing.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A system for determining the status of an electronic device comprising:
   a diagnostic device having a memory to store executable instructions and one or more processors, when implementing the executable instructions, to:
   in response to coupling to an electronic device, communicate diagnostic code to the electronic device related to a boot sequence of the electronic device;
   prevent any boot sequence including the boot sequence;
   force the electronic device into a secure output mode wherein only a diagnostic state of hardware and software of the electronic device are accessed and communicated;
   receive the diagnostic state of the hardware and the software while operating in the secure output mode; and
   communicate the diagnostic state to a user.

2. The system of claim 1, wherein the diagnostic state of the electronic device includes a last known diagnostic state of software of the electronic device.

3. The system of claim 1, wherein the diagnostic state of the electronic device includes a last known diagnostic state of hardware of the electronic device.

4. The system of claim 1, wherein the boot sequence is a basic input/output system boot sequence.

5. The system of claim 1, wherein to communicate the diagnostic state includes actuating an output device of the diagnostic device to provide an output.

6. The system of claim 5, wherein the output device is at least one of a light source, light emitting diode, or a speaker.

7. The system of claim 5, wherein the output includes a series of sounds, or a light pattern.

8. The system of claim 1, wherein the diagnostic device is portable and has a body with a communication port extending therefrom, and the communication port is configured to couple to the electronic device.

9. The system of claim 1, wherein to configure the electronic device with the diagnostic code to dynamically adjust the boot sequence of the electronic device to provide a secure output mode instead of the boot sequence includes preventing the boot sequence and forcing the system into the secure output mode.

10. A method, comprising:
    under control of one or more processors including program instructions to:
    in response to coupling to an electronic device, communicate, from a diagnostic device, diagnostic code to the electronic device related to a boot sequence of the electronic device;
    prevent any boot sequence including the boot sequence;

force the electronic device into a secure output mode wherein only a diagnostic state of hardware and software of the electronic device are accessed and communicated;

receive the diagnostic state of the hardware and the software while operating in the secure output mode; and communicate the diagnostic state to a user.

11. The method of claim 10, wherein the diagnostic state of the electronic device includes a last known diagnostic state of software of the electronic device.

12. The method of claim 10, wherein the diagnostic state of the electronic device includes a last know diagnostic state of hardware of the electronic device.

13. The method of claim 10, wherein to communicate the diagnostic state includes actuating an output device of the diagnostic device to provide an output.

14. A system for determining the status of an electronic device comprising:

a diagnostic device having a memory to store executable instructions and one or more processors, when implementing the executable instructions, to:

in response to coupling to an electronic device, communicate diagnostic code to the electronic device related to a boot sequence of the electronic device;

prevent any boot sequence including the boot sequence;

force the electronic device into a secure output mode wherein only a diagnostic state of hardware and software of the electronic device are accessed and communicated;

receive a diagnostic state of the hardware and the software while operating in the secure output mode, the diagnostic state including at least a last known diagnostic state of software of the electronic device, last known diagnostic state of hardware of the electronic device, or a last known state of the electronic device that is recorded and updated upon a shutdown process; and communicate the diagnostic state to a user.

15. The system of claim 14, wherein the boot sequence is a basic input/output system boot sequence.

16. The system of claim 14, wherein to communicate the diagnostic state includes actuating an output device of the diagnostic device to provide an output.

17. The system of claim 16, wherein the output device is at least one of a light source, light emitting diode, or a speaker.

18. The system of claim 16, wherein the output includes a series of sounds, or a light pattern.

19. The system of claim 14, wherein the diagnostic device is portable and has a body with a communication port extending therefrom.

20. The system of claim 19, wherein the communication port is configured to couple to the electronic device.

* * * * *